3,850,857
Patented Nov. 26, 1974

3,850,857
PROCESS FOR THE POLYMERIZATION OF EPIHALOHYDRIN EMPLOYING A TRIALKYL OXONIUM SALT OF AN HMF$_6$ ACID AS CATALYST
Max Peter Dreyfuss, Akron, Ohio, assignor to The B. F. Goodrich Company, New York, N.Y.
No Drawing. Filed Aug. 20, 1973, Ser. No. 390,030
Int. Cl. C08g 23/14
U.S. Cl. 260—2 A          13 Claims

ABSTRACT OF THE DISCLOSURE

There is disclosed a process for the polymerization of epihalohydrin wherein the catalyst or initiator employed is a trialkyl oxonium salt of an HMF$_6$ acid wherein M is a Group V element selected from the group consisting of phosphorus, arsenic and antimony. The molecular weight of polymers so produced is increased as well as the yield of polymer per unit weight of catalyst employed.

BACKGROUND OF THE INVENTION

It is well known that when epoxides, either alone or in admixture, are polymerized by the use of an ionic catalyst, various polymers are formed due to the ring opening of epoxy groups. These polymers are useful commercially and are used as sizes, film-forming materials, viscosity increasing agents, dispersing agents for suspension polymerization, and the like. The polymerization reactions of epoxides are usually carried out in the bulk state or in organic solvents.

A great variety of catalysts have heretofore been employed in the polymerization of epoxides. Among the various catalysts heretofore so emplyed may be mentiond such materials as hydrofluoric, sulfuric, phosphoric and hydriodic acids, salts such as tin tetrachloride and boron trifluoride complexes especially the diethyl ether complex.

The use of these known catalysts in the polymerization of epihalohydrins has resulted in side reactions during the polymerization which apparently causes the formation of epihalohydrin cyclic dimers and tetramers, and olefins or allylic halide end groups. These side reactions obviously lessen the number of terminal halohydrin groups in the polymer which is formed, thereby lowering the number of epoxide end groups derived therefrom via dehydrohalogenation. Accordingly, employing such polymerization processes, wherein side reactions occur which will lower the ultimate epoxide functionality, results in inferior products. Further, it has been found that polymerizing epoxy-chloro-substituted alkanes using such known catalysts results in materials having relatively low molecular weights, that is, below about 1000.

As a result of the situation in the art, namely, to find a polymerization process which will produce polyepihalohydrins of increased molecular weight economically, there has been a continuing search for an adequate and efficient catalyst to achieve such result. The present invention, as described in detail hereinafter, achieves such desired result.

SUMMARY OF THE INVENTION

It has unexpectedly been found that excellent polymers of epihalohydrins, and in particular, epichlorohydrin, having higher and commercially adequate molecular weights, can be produced by the cationic polymerization thereof using catalytic amounts of a trialkyl oxonium salt of an HMF$_6$ acid, wherein M is a Group V element selected from the group consisting of phosphorus, arsenic and antimony. It was further unexpectedly found that yield was greatly increased over that obtainable with heretofore known catalysts, that is, there is an increase in polymer produced per unit weight of catalyst employed in the reaction. Specifically, exceptionally good results were obtained when epichlorohydrin was polymerized in the presence of triethyloxonium hexafluorophosphate (TEOP) as the cationic catalyst or initiator.

DETAILED DESCRIPTION

The present invention is concerned with producing polymers of high molecular weight or of a molecular weight which results in a rubbery polymeric material suitable for use as such. The invention is particularly applicable to producing polymers of epihalohydrins or halo-substituted alkylene oxides, such as epichlorohydrin, epibromohydrin, and the like. By far, the most important of this class of monomers is epichlorohydrin due to its excellent commercial acceptance and widespread use.

Heretofore, and in general, under cationic conditions, epoxide polymerizations have been difficult to control and the molecular weights of the products produced have been low, and most often too low for most useful commercial applications. Therefore, the choice of the cationic polymerization catalyst or initiator is important, since not all cationic polymerization catalysts will produce the desired end result. I have found that the desired end results can be obtained by employing, as a cationic polymerization catalyst, a trialkyl oxonium salt of an HMF$_6$ acid wherein M is a Group V element selected from the group consisting of phosphorus, arsenic and antimony, such acids being HPF$_6$, HAsF$_6$ and HSbF$_6$.

The catalysts employed in the process of the present invention can be prepared in a number of ways but the most convenient and economical method is that described in my patent, U.S. Pat. No. 3,585,227. This process entails mixing a solution of an HMF$_6$ acid with an epoxide selected from the class consisting of the alkylene oxides and the halogen-substituted alkylene oxides and a dialkyl ether at low temperatures. The ether employed in said process is important since it determines the alkyl groups present in the oxonium salt and one will select the ether for this purpose. There may be employed any of the dialkyl ethers including such ethers where the alkyl groups are alike and those where they are dissimilar including, for example, dimethyl ether, methyl ethyl ether, diethyl ether, dipropyl ether, ethyl propyl ether, di-n-butyl ether, di-n-amyl ether, dihexyl ether, di-2-ethylhexyl ether, etc. The use of dialkyl ethers with dissimilar alkyl groups will produce an oxonium salt in which the alkyl groups also are dissimilar.

While all of the catalysts described above work equally well in the present process, the preferred catalyst is triethyl oxonium hexafluorophosphate (TEOP)

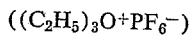

$$((C_2H_5)_3O^+PF_6^-)$$

which is an easily handled, stable crystalline salt. The amount of catalyst or initiator employed will vary but in general, an amount equal to about 0.001 part by weight to about 0.10 part by weight, based on 100 parts by weight of monomer being polymerized, is satisfactory. Since it is usually desirable for economic reasons, to maintain the catalyst level as low as possible, an amount of catalyst in the range of 0.004 part to 0.025 part by weight, based on 100 parts by weight of monomer, is preferred. The specific amount of catalyst used in any particular polymerization reaction will depend upon the particular HMF$_6$ salt being used, the mode of polymerization, the temperature of the reaction, and the like.

In general, in carrying out the process of the present invention, a mass or bulk polymerization technique is employed. That is, no solvent, dispersing agent, or inert diluent is used and the catalyst is added directly to the monomer. The catalyst may be added all at once but preferably, the catalyst is added incrementally, or metered in continuously, during the reaction period in order to better control the temperature and rate of reaction. Alternatively, however, it is possible to carry out the polymerization process of the instant invention in the presence of from about 1 to about 50 parts by weight, based on the weight of the monomer being polymerized, of certain suitable inert organic solvents or diluents. The use of an inert solvent provides for more efficient mixing of the reaction materials, reduces viscosity of the reaction mixture, provides ease in maintaining exothermic control of the reaction mixture and facilitates control of monomeric concentration during polymerization. Suitable inert solvents for use in this invention are the liquid hydrocarbons, such as benzene, toluene, propane, butanes, pentanes, hexane, heptane, cyclohexane, and the like, and chlorinated hydrocarbons, such as chlorobenzene, carbon tetrachloride, and the like.

It should be noted that U.S. Pat. No. 2,856,370 discloses a process for polymerizing cyclic ethers, particularly tetrahydrofuran, employing gaseous phosphorus pentafluoride as a catalyst. The pentafluoride is dissolved directly in the monomer to be polymerized or alternatively, the phosphorus pentafluoride may be first brought in contact with a molar equivalent of the cyclic ether to permit the formation of the $PF_5$/cyclic ether coordination complex. Thereafter, the complex thus formed is used to catalyze the polymerization of the remainder of the cyclic ether. Aside from being derived from a different acid than the catalysts of the instant invention, the complex thus formed is not a trialkyloxonium salt as described in the instant invention. Further, in addition to the said complex not being an organic salt of an $HMF_6$ acid, it is kown that using cationic (acid) catalysts to polymerize epoxides yields only low molecular weight polymers, generally in the form of oils, which is far below the molecular weight range of polymers obtainable by means of the present invention. The catalyst salts of the present invention are unique and their use alone as catalysts in the cationic polymerization of epihalohydrins is quite unexpected.

The temperature employed in the polymerization process of the present invention is usually between about 0° C. and 110° C. However, it is preferred to employ temperatures in the range of about 40° C. to about 80° C., since, at these temperatures polymers having the most beneficial properties are produced. It may be desirable, in many cases, to preheat or precool the contents of the reactor to the desired reaction temperature prior to the addition thereto of the catalyst or initiator. The polymerization reaction is exothermic and thus the reaction temperaure is readily maintained by the controlled rate of catalyst addition. The time of the polymerization reaction will normally vary from about 1 to about 10 hours and in many cases, will vary up to about 24 hours or more, depending upon catalyst used, temperature, etc.

The polymers formed by the herein described process will be of increased or higher molecular weight, that is, higher than the molecular weights heretofore normally obtainable by prior methods for the cationic polymerization of epihalohydrins. The polymers will vary from semi-solids to solids and the weight average molecular weight (Mw) of such polymers will vary from about 45,000 to about 100,000. The molecular weight, as used herein, is normally specified in terms of "Reduced Solution Viscosity" or "RSV." RSV is a point value viscosity determined as the viscosity at 25° C. of a solution of 0.4 gram of polymer dissolved in 100 ml. of dimethyl formamide containing 3% by volume of acetylacetone, expressed as deciliter per gram or dl./g. For example, a weight average molecular weight in the range given above will result in a RSV of about ±0.50. The equivalent weight average molecular weight will be in the range of from about 60,000 to about 80,000.

The polymerization process, described herein, may be carried out at autogenous pressures although superatmospheric pressures of up to 10 atmospheres or more may be employed with some advantage with the more volatile monomers. Superatmospheric pressures may also be employed with those monomers and/or solvents having the requisite volatilities at reaction temperatures permitting reflux cooling of the reaction mixture.

One of the unexpected results of the instant invention is the high yield of polymer obtainable. By yield is meant the weight of polymer produced per unit weight of catalyst or initiator employed. For example, a yield of 500 grams of polymer to about 25,000 grams of polymer per one gram of catalyst used is obtained by use of the present invention. This is far greater than yields heretofore obtainable using known processes.

To further illustrate the present invention, the following specific examples are given, it being understood that this is merely intended in an illustrative and not a limitative sense. In the examples all parts and percents are by weight unless otherwise indicated.

Example I

In this example a series of three runs were made using the bulk polymerization technique. In each run, 296 grams of epichlorohydrin were placed in a stirred reaction vessel and the monomer brought to a temperature of 50° C. Thereafter the catalyst TEOP (triethyloxonium hexafluorophosphate) was added to the reactor at such a rate as to maintain the temperature at about 50° C. throughout the reaction cycle. Conditions and results are given in the following table:

TABLE I

| Run No. | Mg. TEOP | Polymerization time | Percent conversion | RSV | Efficiency, gms. polymer/gm. catalyst |
| --- | --- | --- | --- | --- | --- |
| 1 | 3.7 | 3.5 hours | 32 | 0.51 | 26,000 |
| 2 | 9.0 | 2.5 hours | 45 | 0.57 | 15,000 |
| 3 | 36.0 | 40 minutes | 50 | 0.54 | 4,100 |

As can be seen from the RSV results, the molecular weight of the polymers produced was not appreciably affected by varying the catalyst concentration. The efficiency or yield did drop off with increased catalyst concentration and shortened reaction time.

Example II

In this example epichlorohydrin was polymerized in the presence of the inert solvent pentane using TEOP as the catalyst. The following ingredients were used:

59.3 gms. (50 ml.)—epichlorohydrin
0.0411 gm. TEOP (dissolved in 3.3 ml. distilled methylene chloride)
20 ml. pentane.

The pentane was added to the epichlorohydrin and the mixture cooled with stirring to 0° C. The polymerization was conducted under a nitrogen blanket. 2.5 ml. of the catalyst solution (representing 31 mg. TEOP) was added. The reaction mixture was kept at about 0° C. for 17 hours and then the temperature was raised to about 20° C. for an additional 7 hours. The polymer, polyepichlorohydrin, was removed and washed several times with ethyl alcohol, then dried overnight in a vacuum oven at 55° C. The polymer was clear and almost colorless and rubbery in nature. The conversion of the reaction was 72.5% and the efficiency, or yield, was 1390 gms. polymer per gram of catalyst. The RSV of the polymer was 0.389 indicating a weight average molecular weight of 48,500.

Example III

In this example another series of three runs were made using the bulk polymerization technique and wherein both the temperature of reaction and the amount of catalyst employed was varied. In each run 250 ml. of epichlorohydrin, or 296 gms., were employed. Triethyl oxonium hexafluorophosphate was used as the catalyst in each case. Each polymerization reaction was carried out in a stirred reaction vessel under a blanket of nitrogen. In each case, the catalyst was added incrementally during the reaction period as a solution in methylene chloride. The catalyst solution was injected into the reaction mixture by means of a hypodermic needle. The pertinent conditions and results of each run are given in Table II set out below.

TABLE II

| Run No. | Mg TEOP | Polymerization temperature, °C. | Polymerization time | Percent conversion | RSV | Average molecular weight | Efficiency, gms. polymer/gm. catalyst |
|---|---|---|---|---|---|---|---|
| 4 | 36.0 | 40 | 1 hour 10 minutes | 46 | 0.62 | 75,000 | 3,800 |
| 5 | 45.0 | 30 | 2 hours | 43 | 0.64 | 95,000 | 2,800 |
| 6 | 12.6 | 80 | 1 hour | 35 | 0.42 | 50,000 | 8,350 |

Thus it can be seen from the above data that all the polymers fall within the desirable molecular weight range which heretofore has been difficult with prior known cationic polymerization methods.

Example IV

In this example the bulk polymerization technique was employed, as in Exmaple I. 297 grams of epichlorohydrin were placed in a stirred reaction vessel and the monomer brought to a temperature of 50° C. Thereafter 14.4 mg. of catalyst (triethyloxonium hexafluoroantimonate) was added to the reactor at such a rate as to maintain the temperature at about 50° C. throughout the reaction cycle which continued for a period of 2 hours. At the end of this time the polymer was recovered in usual fashion. There was a 53% conversion and the resultant polymer had an RSV of 0.59 and the efficiency or yield was 11,400 grams of polymer produced per 1 gram of catalyst used.

The polyepihalohydrins produced by the process of the present invention have many commercial advantageous properties making them suitable for a variety of end uses of commercial importance. For example, the polymers exhibit outstanding ozone resistance and gas impermeability. Further, the polymers have good heat resistance and good low temperature flexibility. In addition, the polymers, or speciality rubbers as they are generally referred to, have very good chemical resistance and are resistant to solvents, fuels and oils.

As a result of the above beneficial properties, the polymers find their way into many useful end products. For example, in the manufacture of gaskets, and in varied oil field specialties. They are useful for making jar seals, diaphragms, and pump and valve parts. The polymers are used in making adhesives, as well as tubing and hose. Since the polymers produced by the instant invention have a gas impermeability superior to that of butyl rubber, they are used in making sheeting materials. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. A process for the preparation of epihalohydrin polymers which comprises polymerizing epihalohydrin in the presence of a catalytic amount of a trialkyl oxonium salt of an $HMF_6$ acid wherein M is an element selected from the group consisting of phosphorus, arsenic and antimony.

2. A process as defined in Claim 1 wherein the epihalohydrin is epichlorohydrin.

3. A process as defined in Claim 1 wherein the $HMF_6$ acid is $HPF_6$.

4. A process as defined in Claim 1 wherein the trialkyl oxonium salt is triethyloxonium hexafluorophosphate.

5. A process as defined in Claim 1 wherein the trialkyl oxonium salt is employed in the range of about 0.001 to about 0.100 part by weight based on 100 parts by weight of the epihalohydrin.

6. A process as defined in Claim 1 wherein said polymerization is conducted in the presence of from about 1 to 50 parts by weight, based on the weight of the epihalohydrin, of an inert organic solvent selected from liquid hydrocarbons and liquid chlorinated hydrocarbons.

7. A process as defined in Claim 1 wherein said polymerization is carried out at a temperature in the range of 0° C. to 110° C.

8. A process as defined in Claim 1 wherein the $HMF_6$ acid is $HAsF_6$.

9. A process as defined in Claim 1 wherein the $HMF_6$ acid is $HSbF_6$.

10. A process as defined in Claim 2 wherein the $HMF_6$ acid is $HPF_6$ and the polymerization is carried out at a temperature in the range of 0° C. to 110° C.

11. A process as defined in Claim 10 wherein the trialkyl oxonium salt of $HPF_6$ is triethyloxonium hexafluorophosphate.

12. A process as defined in Claim 11 wherein the triethyloxonium hexafluorophosphate is employed in the range of about 0.001 to about 0.100 part by weight based on 100 parts by weight of the epichlorohydrin.

13. A process as defined in Claim 12 wherein the triethyloxonium hexafluorophosphate is added incrementally to the polymerization during the course thereof.

References Cited
UNITED STATES PATENTS

| 2,856,370 | 10/1958 | Muetterties | 260—2 |
| 3,305,565 | 2/1967 | Mueller | 260—348.6 |
| 3,379,655 | 4/1968 | May et al. | 260—2 |
| 3,442,867 | 5/1969 | May et al. | 260—67 |
| 3,503,898 | 3/1970 | Harris | 252—429 |
| 3,542,828 | 11/1970 | Harris | 260—446 |

MELVIN GOLDSTEIN, Primary Examiner

EARL A. NIELSEN, Assistant Examiner

U.S. Cl. X.R.

252—429, 431 R, 431 P; 260—440, 446, 610 R, 615 B